United States Patent Office

3,441,601
Patented Apr. 29, 1969

3,441,601
PROCESS FOR THE MANUFACTURE OF VINYL ACETATE
Kurt Sennewald, Wilhelm Vogt, and Hermann Glaser, Knapsack, near Cologne, Germany, assignors to Knapsack Aktiengesellschaft, Knapsack, near Cologne, Germany, a corporation of Germany
No Drawing. Filed Mar. 25, 1966, Ser. No. 537,265
Claims priority, application Germany, Apr. 7, 1965, K 55,743
Int. Cl. C07c 67/00
U.S. Cl. 260—497   1 Claim

ABSTRACT OF THE DISCLOSURE

An improved process for the catalytic, vapor phase production of vinyl acetate from ethylene, acetic acid and molecular oxygen is shown. A catalyst for the synthesis reaction comprising metallic palladium supported on an inert carrier is substantially activated by exposure to air and nitrogen. Fresh catalysts, prepared by reducing palladium salt to metallic palladium in the presence of an inert carrier are subjected first to air at elevated temperatures and pressures, and then to nitorgen to effect the desired improvement.

---

The present invention relates to a process for the manufacture of vinyl acetate from ethylene, acetic acid and molecular oxygen or air in the gas phase in contact with a palladium carrier catalyst, which contains 0.1 to 10% by weight palladium and is obtained by reducing a palladium salt to metallic palladium in the presence of a carrier. All reactions carried out heretofore in contact with a palladium carrier catalyst free from other accompanying metals produce but low yields or space/time yields.

It has now been found that in preparing vinyl acetate from ethylene, acetic acid and oxygen or air in the gas phase especially high space/time yields can be obtained using a palladium catalyst prepared in conventional manner, as will more fully be described hereinafter, and after-treated in accordance with the present invention.

Silicic acid with an active ssurface area e.g. of 180 square meters per gram, determined by the BET-method (BET-method, Journal of Amer. Chem. Soc. 60, 309 [1938]), and an apparent density e.g. of 0.39 kg./liter is used as the catalyst carrier which is impregnated with an aqueous $PdCl_2$, $Pd(NO_3)_2$ or $Pd(CH_3COO)_2$-solution previously admixed with a sodium hydroxide solution of any desired concentration until turbidity commences.

The palladium salt in the aqueous solution or the palladium salt solution having a determined concentration is used in a quantity sufficient to ensure that the finished catalyst formed of palladium metal and $SiO_2$ contains 0.1 to 10, preferably 4 to 7, percent by weight palladium. The mass, dried with agitation, is introduced then into a sodium formate solution at 60° C., adjusted with formic acid to have a pH-value of 6. This results in the $PdCl_2$ adsorbed on the catalyst being instantaneously reduced to black Pd, and the resulting mixture is admixed then with sodium hydroxide solution having any desired concentration until the mixture is found to have a pH-value of 8 to 9, liquid matter is decanted off, and the catalyst is carefully washed with water. After having been dried in a vacuum drying cabinet, the catalyst so prepared is placed for after-treatment into a reaction tube having an internal width e.g. of 25 mm., the said tube being maintained at a temperature of about 170° C. by heating it by means of a liquid, and a stream of air maintained under a pressure of 3 atmospheres absolute is caused to flow through the tube for a period of 1 to 2 hours.

The actual reaction mixture which has a composition outside the limit of explosion and is formed, e.g. of 25% by volume acetic acid in vapor form, 46% by volume ethylene, 23% by volume nitrogen and 6% by volume oxygen, is caused then to travel through the same tube over the catalyst therein. This enables a space/time yield of 13 grams vinyl acetate per liner of catalyst (4% Pd) per hour to be obtained.

When a reaction gas mixture free from nitrogen, i.e. a reaction mixture composed approximately of 18% by volume acetic acid in vapor form, 74% by volume ethylene and 8% by volume oxygen is caused to flow over the after-treated catalyst, it is found that the reaction succumbs after some time.

The importance to be attributed to the inventive aftertreatment of the catalyst by means of air is demonstrated in Example 2 below in which a catalyst not subjected to after-treatment is used. As will be shown, no vinyl acetate is formed. The reaction mixture used in that example admittedly did not contain nitrogen and especially unfavorable reaction conditions were accordingly used; however, even in the presence of nitrogen, the reaction started very reluctantly when the catalyst used was one of the type not after-treated, and formation of vinyl acetate was limited to detectable traces.

The space/time yield can unexpectedly be increased to substantially more than 13 grams vinyl acetate per liter of catalyst per hour when, following the after-treatment with air, the catalyst is scavenged with nitrogen gas for a period of some hours, e.g. for a period of 4 to 60 hours, at a temperature of about 170° C., and when reaction gas mixture containing nitrogen is successively caused to flow over the catalyst.

In this event, the vinyl acetate space/time yields were 32 grams per liter per hour (4% Pd; 3 atmospheres absolute), 54 grams per liter per hour (4% Pd; 6 atmospheres absolute) and 70 grams per liter per hour (6.5% Pd; 6 atmospheres absolute), respectively. It is especially remarkable that the space/time yield remains practically the same over a period of at least one month; after interruption periods, it was found to be immediately obtainable again provided that the catalyst had been maintained under nitrogen during such interruption periods.

However, the present invention is not limited to the use of a palladium/silicic acid catalyst. Aluminum oxide, aluminum silicate, aluminum phosphate or carbon, alone or in admixture with one another, can also be used as the carrier material. The carrier may have an active surface area of between 50 and 400 square meters per gram. In addition to reducing $Pd^{II}$ to $Pd^0$ by means of formate, the $Pd^{II}$ can be reduced by other methods, e.g. by means of sodium borohydride (sodium boranate, $NaBH_4$), hydrogen or hydrazine hydrate. Preferably, however, the palladium chloride should be reduced by means of a composition comprising alkali metal formate and formic acid in the presence of silicic acid and the dried catalyst should be after-treated with air and/or nitrogen. The catalyst should conveniently be subjected to treatment with air or nitrogen at a temperature between 120 and 350° C., preferably 150 and 200° C., and under a pressure within the range of 1 and 10 atmospheres absolute, and the actual reaction of ethylene, acetic acid and air in contact with the catalyst to give vinyl acetate should be carried out at temperatures of 120 to 250° C., preferably 150 to 200° C., under a pressure of 1 to 10 atmospheres absolute.

The manufacture of vinyl acetate in accordance with the present invention while using a palladium carrier catalyst after-treated with nitrogen or air unexpectedly results not only in especially high space/time yields, but also in the after-treated catalyst having a temperature sensitiveness, which is known to incur increased formation of by-products and combustion to give $CO_2$, considerably lower than the sensitiveness of a catalyst not treated with nitrogen.

The present invention relates more especially to a process for the maufacture of vinyl acetate from ethylene, acetic acid and molecular oxygen or air in contact with a palladium carrier catalyst containing 0.1 to 10% by weight palladium, prepared by reducing a palladium salt to give metallic palladium in the presence of a carrier, by reacting the starting materials in the gas phase, wherein the palladium carrier catalyst, prior to its being used, is treated for a period of some hours with air and/or nitrogen. Silicic acid is preferably used as the carrier, and the palladium salt is preferably reduced by means of a composition comprising an alkali metal formate solution and formic acid.

In accordance with a further feature of the present invention, the palladium carrier catalyst is prepared by impregnating the silicic acid with an aqueous palladium salt solution, admixed with a proportion of alkali metal hydroxide solution sufficient to produce turbidity, drying the silicic acid so impregnated, introducing the dried matter into a hot alkali metal formate solution at about 60–90° C., adjusted with formic acid to have a pH-value of 6, alkalizing the resultant mixture by means of an alkali metal hydroxide solution until a pH-value of 8–9 is obtained, decanting off liquid matter, washing the palladium-containing silicic acid by means of water, drying and ultimately treating the said palladium-containing silicic acid for a period of some hours with nitrogen and, if desired, with air at a temperature between 150 and 200° C., under a pressure of 1 to 10 atmospheres absolute.

The following examples are intended to illustrate preparation of the catalyst as well as after-treatment and use thereof in accordance with the present invention:

Example 1

1 liter silicic acid in the form of strands 4 mm. wide with an active surface area of 180 square meters per gram and an apparent density of 0.39 kg. per liter was mixed with 400 cc. of an aqueous solution of 25.7 grams $PdCl_2$, which had been admixed with 2 N-sodium hydroxide solution until palladium hydroxide commenced to precipitate, and the mixture was dried with agitation. The dry mass was introduced then into 600 cc. of a solution of 80 grams formic acid and 65 grams NaOH in water. The solution should have a temperature of not less than 60° C. The palladium chloride underwent immediate reduction accompanied by $CO_2$-evolution. After some minutes, the mixture was rendered alkaline by means of sodium hydrixide solution to have a pH-value of 8–9, water was poured off, and the whole was after-treated with plenty of distilled water. The catalyst so produced was ultimately dried in vacuo at about 60° C. It contained about 4% Pd.

Example 2

200 cc. of the catalyst mass described in Example 1 were introduced into an 18/8 chrome-nickel steel tube with an internal width of 25 mm., in which was placed a chrome-nickel steel core tube which had an external diameter of 14 mm. and was intended to receive thermo-resistors for temperature determination, and the catalyst mass was maintained at a temperature of 170° C. by gentle heating of the tube in a liquid bath. 150 normal liters (measured at N.T.P.) of a gas mixture formed of 18% by volume acetic acid, 74% by volume ethylene, and 8% by volume oxygen were caused to travel, per hour, under a pressure of 3 atmospheres absolute through the tube held in upright position. The gas mixture leaving the reaction tube was cooled down to a temperature of −70° C. to isolate condensable matter, which may contain the reaction product, and the condensed matter was analyzed by distillation. No vinyl acetate could be found to have been formed within 2 days. Detectable traces were, however, found to have been formed thereafter.

Examples 3 to 7

A catalyst prepared in the manner set forth in Example 1, prior to being used in the apparatus described in Example 2, was treated with air or nitrogen. The reaction conditions are indicated in the table below. The oxidizing agent in the reaction gas mixture was air rather than pure oxygen. The starting mixture thus was formed of 25% by volume acetic acid, 46% by volume ethylene, 6% by volume oxygen, and 23% by volume nitrogen. The space/time yields obtained are indicated in the table below. In addition to vinyl acetate, small proportions of acetaldehyde and $CO_2$ were obtained under the specified reaction conditions.

About 92 to 94% of the carbon contained in these reaction products were obtained in the form of vinyl acetate, 3 to 5% were obtained in the form of $CO_2$, and the balance was obtained in the form of acetaldehyde.

Example 8

1 liter silicic acid in the form of strands such as described in Example 1 was mixed with 400 cc. of an aqueous solution containing 6.5 grams $PdCl_2$, and the resulting mixture was dried with agitation. The dried mass was introduced into a methanolic solution of sodium boranate ($NaBH_4$). The reducing colution had been prepared by dissolving 10 grams sodium boranate in 50 cc. water and thereafter introducing the solution into 1 liter methanol. The palladium chloride underwent immediate reduction accompanied by hydrogen evolution. After the reduction was complete, the methanol was poured off, the catalyst was thoroughly washed with water, and dried in vacuo at 60° C. The catalyst, which contained about 1% Pd, was treated for 2 hours with air and for a further 5 hours with nitrogen, at a temperature of 170° C. and under a pressure of 6 atmospheres absolute. The catalyst activity was 15 grams vinyl acetate per liter of catalyst per hour.

| Example | Catalyst treatment | Oxydant | Operating temperature in ° C. | Operating pressure, atmospheres absolute | Space/time yield, grams per liter per hour |
| --- | --- | --- | --- | --- | --- |
| 2 | No after-treatment | $O_2$ | 170 | 3 | 0 |
| 3 | Preparation as set forth in Example 1; air-treated for 105 minutes at 170° C. | Air | 170 | 3 | 13.2 |
| 4 | Preparation as set forth in Example 1: air-treated for 105 minutes and $N_2$-treated for 16 hours at 170° C. | Air | 170 | 3 | 20.8 |
| 5 | Preparation as set forth in Example 1: air-treated for 3 hours, $N_2$-treated for 4 hours at 170° C. | Air | 170 | 3 | 25.3 |
| 6 | See Example 5 | Air | 170 | 6 | 47–54 |
| 7 | Preparation as set forth in Example 1, but 6.5% Pd. air-treated for 4 hours, $N_2$-treated for 60 hours at 170° C. | Air | 170 | 6 | 70 |

We claim:
1. In a process for the catalytic, vapor phase production of vinyl acetate wherein ethylene, acetic acid and molecular oxygen are passed over a catalyst containing 0.1 to 10% by weight palladium metal supported on an inert carrier, said catalyst having been prepared by reducing a palladium salt to metallic palladium in the presence of said inert carrier, the improvement which comprises: treating the catalyst, prior to its use in the reaction, with air for 1 to 4 hours at a temperature between 120° and 350° C. and under a pressure of 1 to 10 atmospheres absolute and subsequently treating said catalyst with nitrogen for 4 to 60 hours under the same conditions.

References Cited

UNITED STATES PATENTS 3,190,912 6/1965 Robinson _____ 260—497
3,300,528 1/1967 Wakasa et al. _____ 260—497

LORRAINE A. WEINBERGER, *Primary Examiner.*
V. GARNER, *Assistant Examiner.*

U.S. Cl. X.R.
252—460